T. H. Lowerre.
Brushing & Finishing Hats.
Nº 48417. Patented Jun. 27, 1865.
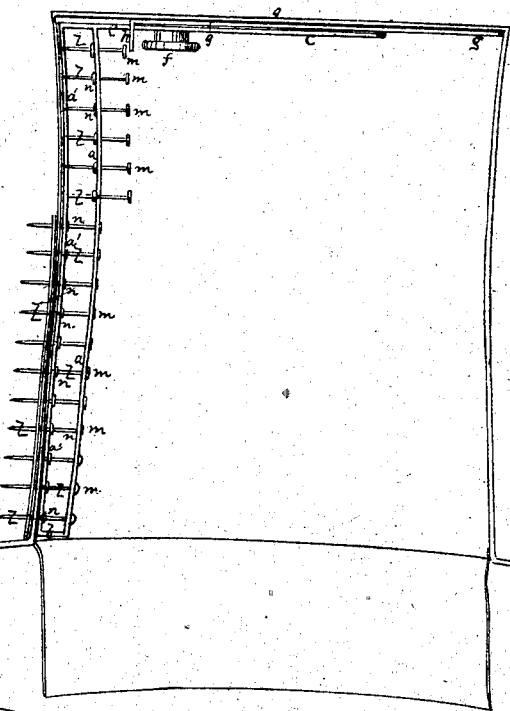
Fig. 1.
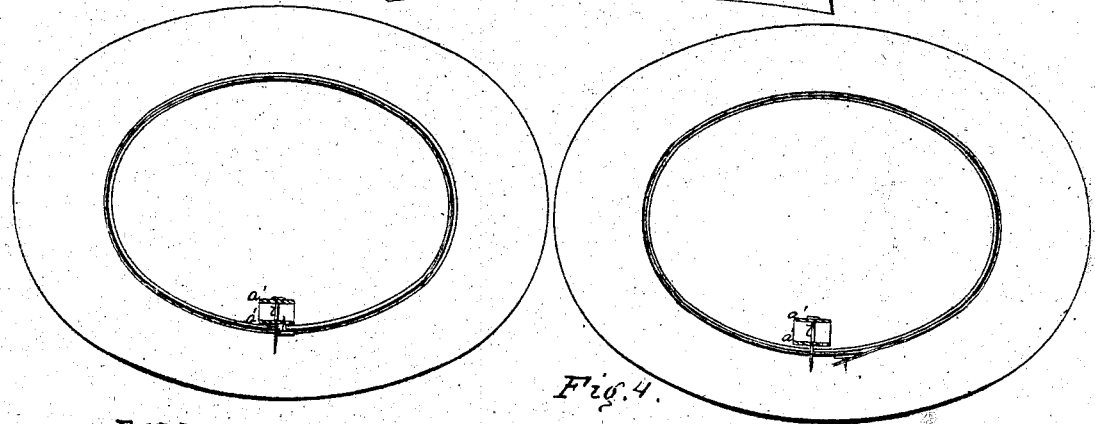
Fig. 3. Fig. 2.
Fig. 4.
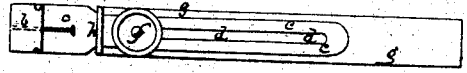
Witnesses
Inventor

UNITED STATES PATENT OFFICE.

THOMAS H. LOWERRE, OF NEW YORK, N. Y.

APPARATUS FOR ATTACHING MOURNING-BADGES TO HATS.

Specification forming part of Letters Patent No. 48,417, dated June 27, 1865.

*To all whom it may concern:*

Be it known that I, T. H. LOWERRE, of No. 148 Nassau street, in the city, county, and State of New York, have invented a new and useful Device for Securing Bombazine to Hats; and I do hereby declare that the following is a full, clear, and exact description thereof, which will enable others skilled in the art to make and use the same, reference being had to the accompanying drawings, forming part of this specification.

By the usual and familiar mode heretofore practiced for securing bombazine to hats it was not only necessary to exercise much care, but it occupied a considerable length of time, and often greatly injured and defaced the hat, as is well known to all conversant with their manufacture.

To remedy these objections is therefore the object of the present invention, and is accomplished thereby, it consisting in a new and peculiar implement or device, to be herein particularly described, by means of which the bombazine can be readily, easily, and with but little care or trouble fastened to the hat, and with no danger of injuring or defacing the same.

In the accompanying plate of drawings my new implement is illustrated, Figure 1 being a side view of the same, showing it as applied to a hat; Figs. 2 and 3, horizontal transverse sections of Fig. 1, showing the manner of holding the bombazine to the hat while being secured thereto; and Fig. 4, a plan or top view of the implement detached from the hat.

$a$ $a$ in the drawings represent two parallel upright narrow plates, made of metal or any other suitable material, and equal in length, or nearly so, to the ordinary heights of hats, attached together at one end by a cross-piece, $b$, and secured at the other end to and upon the plate $c$, at right angles, or nearly so, to the same. In plate $c$, and in the direction of its length, is a slot, $d$, through which passes a thumb-screw, $f$, of the plate $g$, upon which the plate $c$ moves, guided by an upright piece, $h$, of the same. The upright plates $a$ $a$ are slightly curved, so as to more fully conform to the shape of the hat when the implement is inserted therein, as will be presently described, and have passing through them, across from one to the other, a series of sharp-pointed pins, $l$ $l$, which may consist of any number, and placed at equal or unequal distances apart, according as may be desired, with suitable-shaped heads $m$ $m$ upon the inner ends and stops $n$ $n$ on that portion of them between the two plates, which hold them in place and prevent them from becoming disengaged therefrom, as is evident without further description.

To use the implement constructed as above described, first remove the lining from the hat and turn its "sweat-lining," so termed, outward, as represented in Fig. 1, and as usual by the modes of fastening bombazine to hats heretofore employed; then insert the implement within the hat, with its plate $g$ across and resting upon the inside of the top portion, and with its outer end, $o$, against one side of the same, (previously, however, having arranged all the pins of the plate-frame so that their points shall not project beyond the plate $a'$;) then move the plate $a'$ toward the side of the hat nearest to it until it comes to a close bearing therewith for its entire height, where it is secured and held by screwing the set-screw $f$ sufficiently tight upon the plate $e$; then, holding the hat in proper position, place one end of the bombazine upon the outside of the same, at or across that part of it opposite to the frame set upon its inside, as described, and there secure it by pushing a sufficient number of the pins of the frame through it, as represented in Fig. 1, when, having passed it entirely around the hat, and brought its other end to and over the part held by the pins, secure the same together and to the hat in any proper manner, or by any of the means ordinarily employed therefor.

From the above description of my new implement and the manner in which it is used it is plainly apparent that not only can bombazine be more readily and easily secured to hats than by the ordinary mode, and in less time, but that, also, there is no possibility of injuring or "breaking" (as it is termed) the hat, for the reason that the frame-piece held against its inside serves as a support thereto and holds it firm and rigid.

Although I have above stated that the usual means may be used for securing the ends of the bombazine together and to the hat, I find in practice (by using a thin and narrow plate of metal of the same length, or nearly so, as the height to which the bombazine is to extend upward upon the hat, provided upon one of its sides with a series of sharp projecting spurs or points, which plate, with its spurs outward, is laid upon the end of the bombazine held by the pins, and its other end, as it passed around the hat, placed over and upon the spurs, as represented in Fig. 2, when it is taken by the hands and so turned over as to bring its points against the hat, through which they are forced, and then fastened by nipping or in any other proper manner upon the inside) that the bombazine is thus firmly and securely held, and a neat and tasty seam formed, the plate when reversed in position, as above described, being turned in the proper direction to cause it to be covered by the fabric. The implement, after having secured the bombazine to the hat in any proper manner, is then removed therefrom, it being only necessary to pull in its pins and loosen the set-screw, as is evident without further description.

It may be here remarked, in conclusion, and as one among the many important advantages of my new bombazine-fastener, that the bombazine can be placed upon the hat with more evenness and smoothness, as the pins so firmly hold it as to allow it to be stretched or pulled to any desired degree of tightness about the hat.

What I claim as new, and desire to secure by Letters Patent, is—

The implement herein described for securing bombazine to hats.

THOMAS H. LOWERRE.

Witnesses:
M. M. LIVINGSTON,
ALBERT W. BROWN.